(12) United States Patent　　　(10) Patent No.: US 11,731,666 B2
Quillard et al.　　　(45) Date of Patent: Aug. 22, 2023

(54) TANDEM PULLEY

(71) Applicant: ZEDEL, Crolles (FR)

(72) Inventors: Christophe Quillard, Eybens (FR); Benoît Vuillermoz, Saint-Martin-d'Hères (FR)

(73) Assignee: ZEDEL, Crolles (FR)

( * ) Notice: Subject to any disclaimer, the term of this patent is extended or adjusted under 35 U.S.C. 154(b) by 534 days.

(21) Appl. No.: 16/894,995

(22) Filed: Jun. 8, 2020

(65) Prior Publication Data

US 2020/0385028 A1　Dec. 10, 2020

(30) Foreign Application Priority Data

Jun. 6, 2019　(FR) ...................................... 1906051

(51) Int. Cl.
| | |
|---|---|
| *B61B 12/02* | (2006.01) |
| *A63G 21/22* | (2006.01) |
| *B61B 7/00* | (2006.01) |
| *F16B 45/02* | (2006.01) |

(52) U.S. Cl.
CPC .............. *B61B 12/02* (2013.01); *A63G 21/22* (2013.01); *B61B 7/00* (2013.01); *F16B 45/02* (2013.01)

(58) Field of Classification Search
CPC ........... B61B 12/02; B61B 7/00; A63G 21/22; F16B 45/02
See application file for complete search history.

(56) References Cited

U.S. PATENT DOCUMENTS

| 4,892,508 A * | 1/1990 | Ryan ....................... B61B 12/06 |
| | | 105/151 |
| 6,810,818 B2 | 11/2004 | Petzl et al. |
| 7,845,467 B2 * | 12/2010 | Petzl ........................ A62B 1/14 |
| | | 182/71 |
| 2015/0266454 A1 | 9/2015 | McGowan |
| 2018/0216656 A1 | 8/2018 | Bailey et al. |

FOREIGN PATENT DOCUMENTS

| DE | 10 2007 028 119 A1 | 12/2008 |
| EP | 1 386 814 A1 | 2/2004 |
| WO | 2011/078460 A1 | 6/2011 |

OTHER PUBLICATIONS

Jan. 22, 2020 French Search Report issued in French Patent Application No. 1906051.

* cited by examiner

*Primary Examiner* — Kimberly T Wood
(74) *Attorney, Agent, or Firm* — Oliff PLC

(57) ABSTRACT

A tandem pulley includes a support bracket having the shape of an inverted U. The support bracket defines a through hole. A pair of sheaves is arranged in line inside the support bracket. Each sheave is mounted rotating freely around a spindle fixed to the support bracket. A carabiner is fitted in the through hole. A connector is configured to connect the support bracket with the carabiner. The connector is configured in such a way as to allow rotation of the carabiner around an axis parallel to the spindles of the pair of sheaves. A spring is connected to the support bracket, the spring being arranged to exert a force on the carabiner biasing the latter to a rest position by rotation of the carabiner.

11 Claims, 7 Drawing Sheets

TANDEM PULLEY

BACKGROUND OF THE INVENTION

The invention relates to a tandem pulley.

PRIOR ART

In a large number of fields, it is known to use a tandem pulley that has to run on a cable. For example, the tandem pulley is commonly used when setting up zip lines with a user sliding along the cable.

The tandem pulley has two rotationally mounted sheaves. The cable is fitted inside the pulley in contact with the two sheaves. The tandem pulley is provided with a carabiner for making the mechanical connection between the user suspended from the pulley and the cable that secures the pulley.

In conventional manner, on a zip line, the cable is inclined and the user makes a controlled fall when he slides along the cable. At the end of the cable, the user reaches a stopping area formed by an obstacle on the cable. The stopping area is conventionally provided with an elastically deformable damper configured to absorb a part of the energy procured by the pulley when the impact with the pulley occurs.

The pulley comes into contact with the stopping area with a velocity that may be high resulting in the stopping area being struck by the tandem pulley with an energy that is not negligible. It has been observed that when the impact takes place, the pulley can no longer move in the longitudinal direction of the cable making the pulley rear up as the user is still moving in the longitudinal direction of the cable. The pulley swivels with respect to the axis of rotation of the rear sheave, i.e. the one farther away from the stopping area, in order to attempt to continue advancing along the cable. The front sheave loses contact with the cable.

This results in premature wear of the brake formed in the stopping area following the large number of slippages of the tandem pulleys that bump and slide on the stopping area. This also results in premature wear of the rear sheave.

A tandem pulley is known from the document U.S. Pat. No. 6,810,818 filed by the applicant. A large number of tandem pulleys exist on the market including the ZIP EVO pulley marketed by KONG, the WING2 pulley marketed by CAMP or the ZIPPEY pulley marketed by ISC for which the user attachment zone is monolithic with the pulley bracket. For these different pulleys, the pulley coming to an abrupt halt results in loss of contact between the cable and the front sheave.

To reduce this loss of contact, the IMPACT pulley marketed by HEADRUSH has a carabiner attachment area located on the front sheave. This configuration imposes a running direction by forcing the user to hook up under the front sheave. This configuration prevents or reduces involuntary rotation of the pulley with respect to the cable. This configuration is however specific which means that it has to be installed by a professional who has to use both hands. The EZ CLIP pulley marketed by HEADRUSH also has a carabiner that is movable in rotation with respect to the bracket. Here again, both hands have to be used to fit the pulley on the cable and hook up to the pulley.

OBJECT OF THE INVENTION

One object of the invention consists in providing a tandem pulley that reduces or even eliminates swivelling of the pulley when it reaches the stopping area. For this purpose, the tandem pulley comprises:

- a support bracket defining a through hole,
- a pair of sheaves arranged in line inside the support bracket, each sheave being fitted rotating freely around a spindle fixed to the support bracket,
- a carabiner fitted in the through hole, the carabiner being fitted rotating around an axis parallel to the spindles of the pair of sheaves,
- a flexible device connected to the support bracket, the flexible device being arranged to exert a force on the carabiner and to move the carabiner to a rest position by rotation of the carabiner.

Preferentially, each sheave is configured to pivot around an axis of rotation, the axes of rotation of the sheaves and the axis of rotation of the carabiner belonging substantially to one and the same plane.

According to a development of the invention, the carabiner comprises a body defining a flat surface, the flexible device exerting a force on the flat surface to bias the carabiner to the rest position.

In advantageous manner, the flexible device is arranged on one side of the plane, the carabiner having a movable gate arranged on the other side of the plane.

According to one development, the carabiner defines a first salient area forming a first end-of-travel stop pressing on a flange of the support bracket when rotation of the carabiner takes place from the rest position in a first direction of rotation.

Advantageously, the carabiner defines a second salient area forming a second end-of-travel stop when rotation of the carabiner takes place from the rest position.

In preferential manner, the first salient area and the second salient area are separated by the flat surface in the direction of rotation of the carabiner.

In a particular embodiment, the first salient area and/or the second salient area collaborate with a clamp to prevent movement of the carabiner perpendicularly to the plane containing the two axes of rotation of the pair of sheaves.

It is also advantageous to provide for the flexible device to apply a force on the carabiner that is greater than the weight of the support bracket.

Preferentially, a lanyard is fixed to the carabiner.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

Figure 1:
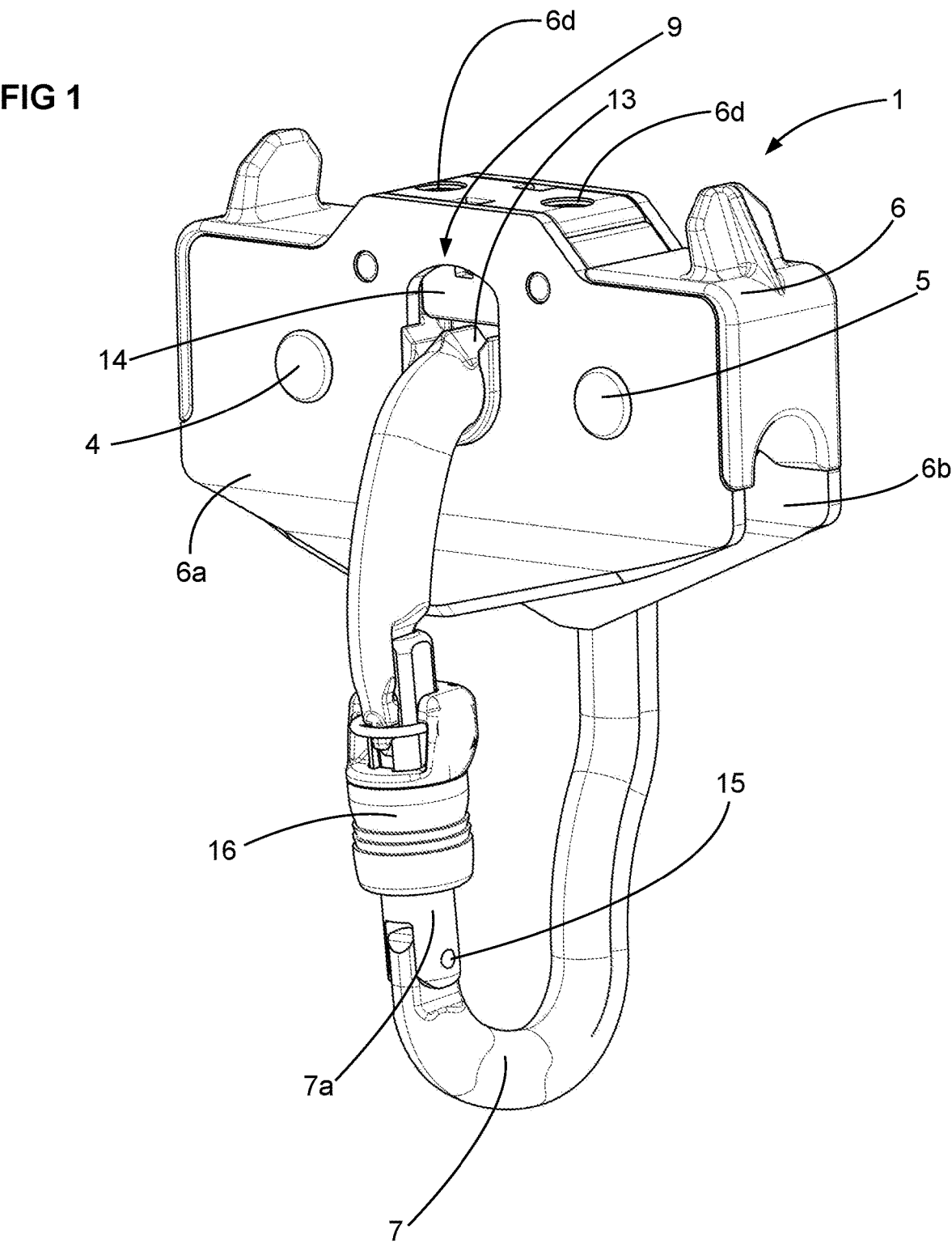
FIG. 1 schematically illustrates a tandem pulley with a closed carabiner.

As illustrated in FIGS. 1 to 7, a tandem pulley device 1 comprises a pair of sheaves 2, 3 which advantageously have identical structures. The pair of sheaves 2, 3 is fitted in line. Each sheave 2, 3 is fitted rotating freely on a spindle 4, 5. The two spindles 4, 5 are fixed on a support bracket 6. Support bracket 6 is advantageously in the shape of an inverted U. Support bracket 6 can be a metal support bracket. The support bracket can be formed by a metal sheet deformed to define a U-shape or substantially a U-shape. The support bracket can be formed by assembly of several parts for example first and second flanges.

Such a device is advantageously used for aerial transportation of a person when performing Tyrolean traversing on a support rope or cable (not shown). The tandem pulley slides along a cable that is fixed.

Figure 2:
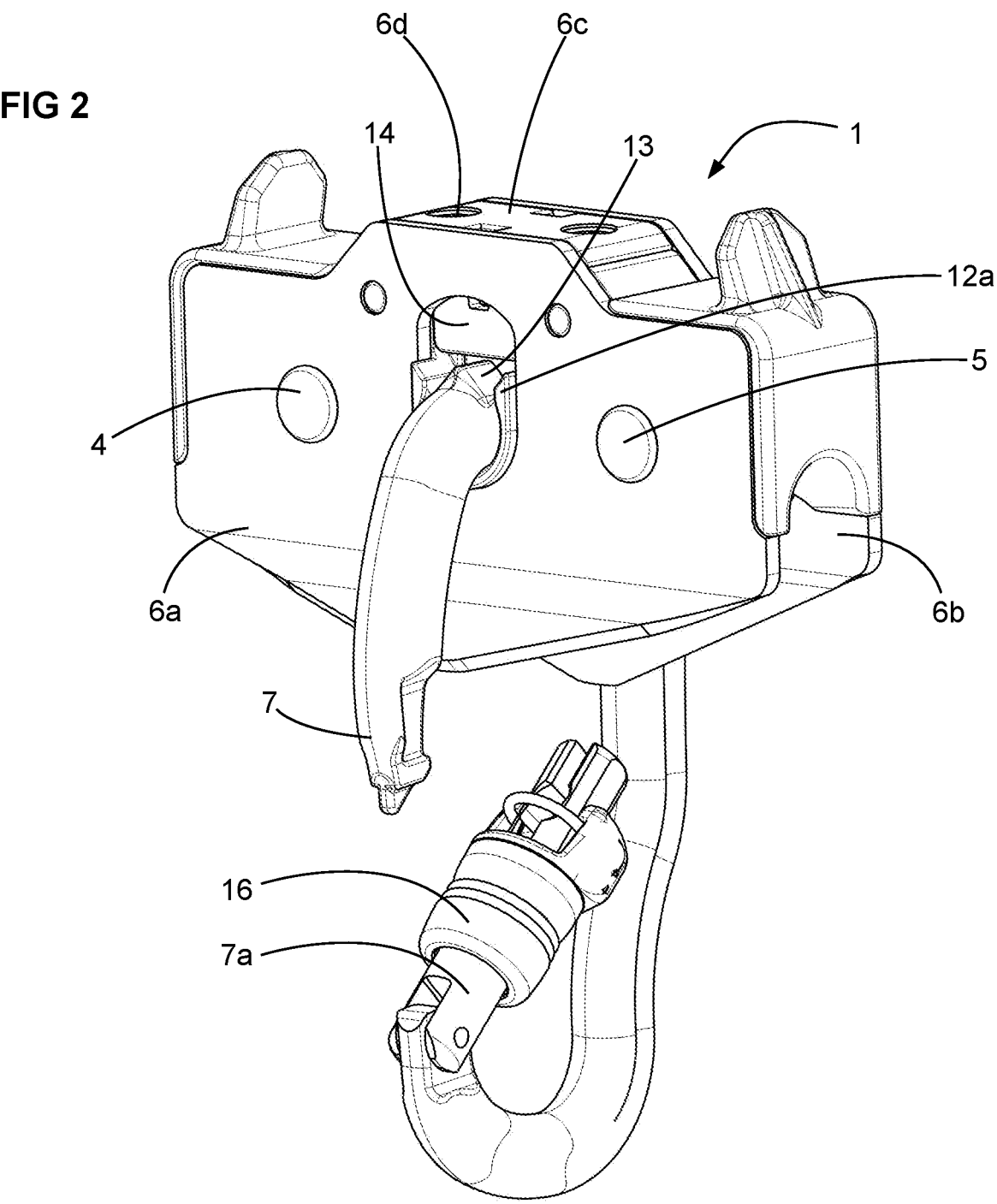
FIG. 2 schematically represents a tandem pulley with an open carabiner.

As illustrated in FIGS. 1 and 2, support bracket 6 defines a through hole which is an insertion hole for a carabiner 7. Carabiner 7 passes through support bracket 6 thereby defining the mechanical connection between carabiner 7 and the cable. Carabiner 7 is fitted in the through hole to define the mechanical connection between the user and the cable. When the user is suspended by means of carabiner 7, carabiner 7 presses on the support bracket that is secured by the cable.

The two sheaves 2, 3 are mounted moving in rotation by means of two rotation spindles 4, 5. The two rotation spindles 4, 5 are fitted parallel to one another. The two rotation spindles 4, 5 define two different axes of rotation. The two axes of rotation belong to the same plane which divides each sheave into two equal parts. In advantageous manner, the two sheaves 2, 3 are mounted fixed on bracket 6.

In a particular embodiment, bracket 6 has two opposite flanges 6a, 6b. The two spindles 4, 5 are advantageously mounted fixed on the two flanges 6a, 6b.

As illustrated in FIGS. 4, 5, 6 and 7, carabiner 7 is fitted so as to be able to swivel enabling the mechanical connection that exists between the user and the cable to be modified in particular in the deceleration phases and more particularly when the end of tandem pulley 1 reaches the stopping area of the cable. When deceleration of the tandem pulley takes place, rotation of carabiner 7 enables rotation of the pulley with respect to the rotation spindle of the rear sheave to be reduced and even prevented. Carabiner 7 and support bracket 6 are configured to allow rotation of carabiner 7 towards the front part of the pulley when the latter moves. When rotation of the pulley takes place, the bottom end of carabiner 7 moves towards the front end of the pulley. The top end of the carabiner is fitted in bracket 6.

It becomes apparent from use that using a carabiner 7 that is movable with respect to bracket 6 is not very practical. The pulleys are mainly used by people who are not expert in handling the pulley. When carabiner 7 is mounted rotating freely with respect to support bracket 6, this results in bracket 6 rotating due to the effect of its weight when the pulley has to be installed on the cable when it is secured by the carabiner.

In conventional manner, carabiner 7 has a movable gate 7a enabling the cable to be inserted in carabiner 7 or extracted from carabiner 7. Movable gate 7a is fitted pivoting around an axis that is substantially parallel to the axis of the cable in the two sheaves. To insert or extract the cable, the user has to open the carabiner, which means applying a force on the gate and therefore requires a firm grip to be had on the carabiner. With a carabiner 7 fitted rotating freely with respect to bracket 6, bracket 6 rotates during the insertion and extraction phases which makes this operation more complicated. The user is forced to use both hands. The first hand holds the carabiner while the second hand holds the bracket.

For ease of use of the tandem pulley, a spring 8 is connected to support bracket 6 and spring 8 is configured to apply a force on carabiner 7. The force applied by spring 8 is configured to bias carabiner 7 to a rest position and to limit or prevent rotation between carabiner 7 and support bracket 6 when the force applied is lower than a threshold force. When the user is holding the tandem pulley via carabiner 7, spring 8 prevents rotation of the bracket with respect to the carabiner. The value of the threshold force is advantageously greater than or equal to the weight of bracket 6. What is meant by spring is a flexible device, i.e. a device that deforms elastically from its rest position when it is subjected to a force and that returns to the rest position after the force has disappeared. The flexible device can be a coil spring actuated in compression or in traction, a coil spring actuated in torsion or any other component able to deform elastically. The flexible device can be made from metal or plastic, for example from elastomer.

When the user handles tandem pulley 1 holding the latter via the carabiner, bracket 6 is stationary with respect to carabiner 7. When the user is suspended on carabiner 7 and the pulley decelerates faster than the user, the force applied by the user is greater than the threshold force and carabiner 7 constrains spring 8 which attempts to oppose rotation of carabiner 7. Swivelling of carabiner 7 prevents or reduces the rotation of the pulley with respect to the cable. The two sheaves remain in contact with the cable for a longer time.

Once tandem pulley 1 is at a standstill or almost at a standstill, the force applied by the spring again becomes higher than the force applied by the user thus moving the carabiner back to the rest position. In this way, when deceleration of pulley 1 takes place, carabiner 7 rotates so as to follow the inertia of the user suspended on carabiner 7 until the latter stops moving. Once the user's speed with respect to the cable has become low or nil, the carabiner returns to its rest position due to the fact that the spring applies a sufficient constraining force. The user can then operate tandem pulley 1 using only carabiner 7.

Spring 8 enables carabiner 7 to be returned to the rest position in passive manner, i.e. without any user action.

In order to enhance safety, it is particularly advantageous to provide for support bracket 6 and carabiner 7 to be shaped in such a way as to prevent carabiner 7 from opening when carabiner 7 is not in the rest position or at more than 20° with respect to the rest position. This configuration can be obtained using a bracket 6 the size of one of flanges 6a of which changes when rotation takes place from the rest position. In this way, beyond a threshold position, flange 6a prevents opening of gate 7a of carabiner 7. This configuration makes it possible to detect ageing of spring 8 no longer able to move carabiner 7 back to the rest position at an earlier stage.

Figure 4:
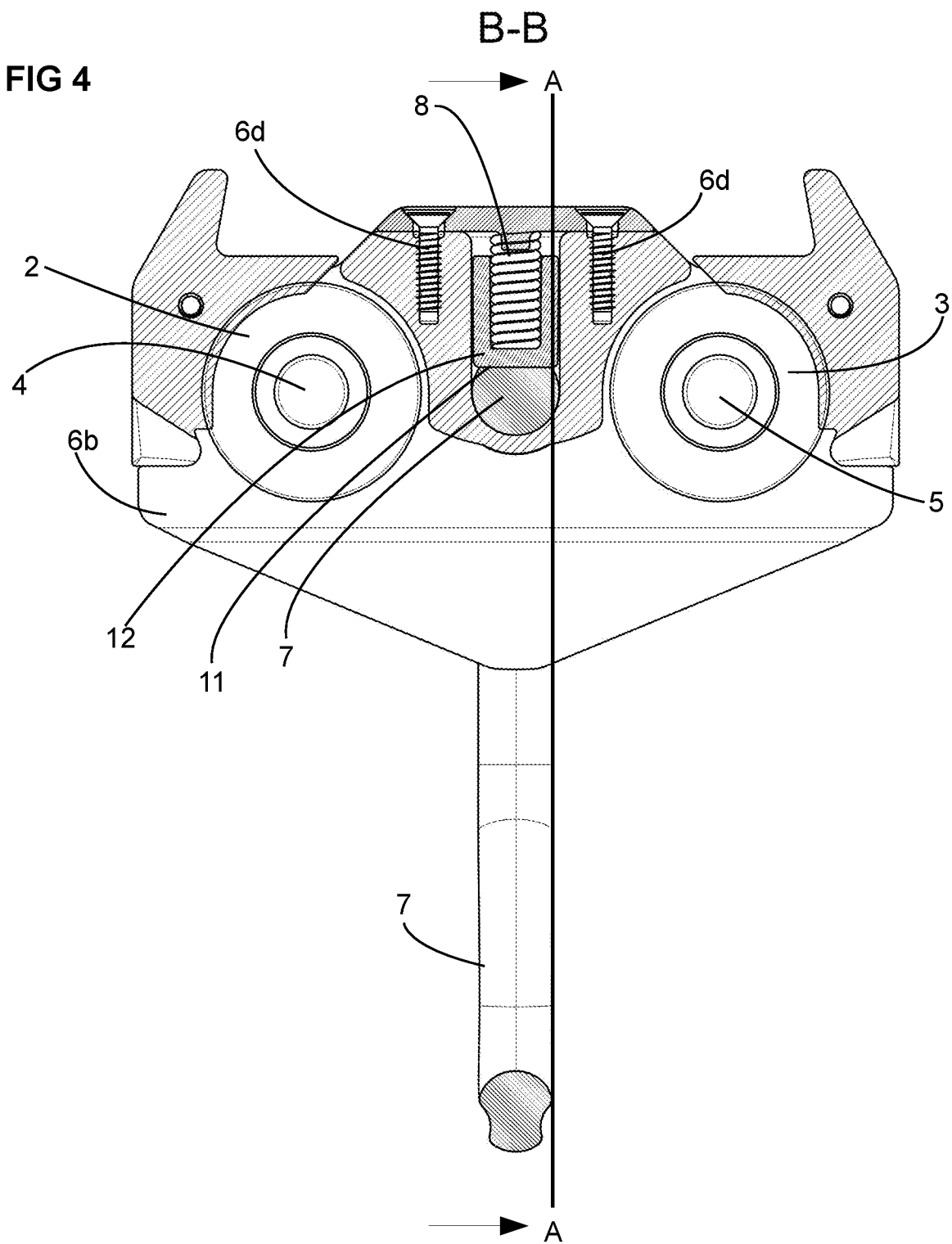
Figure 5:
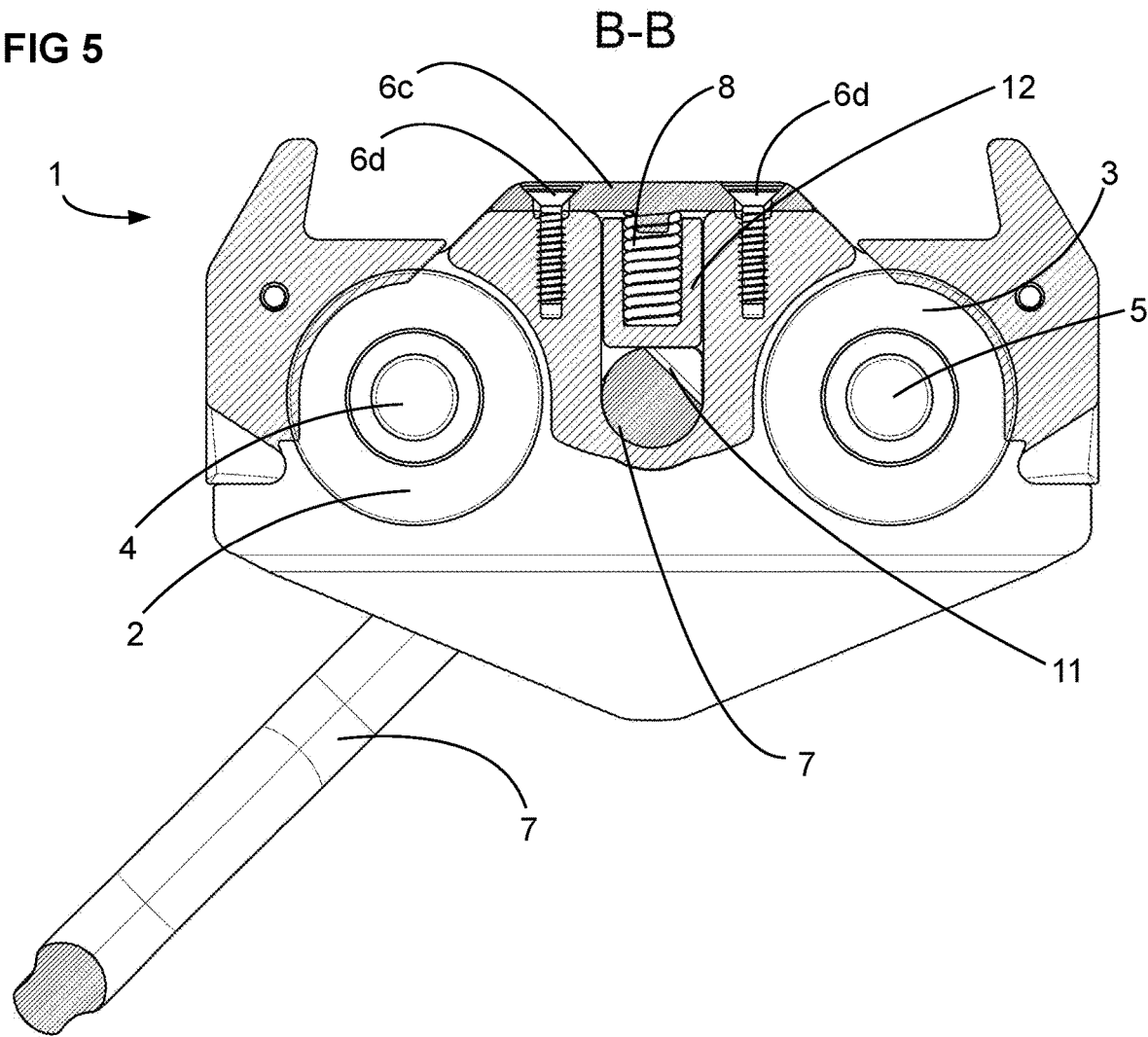
Figure 6:
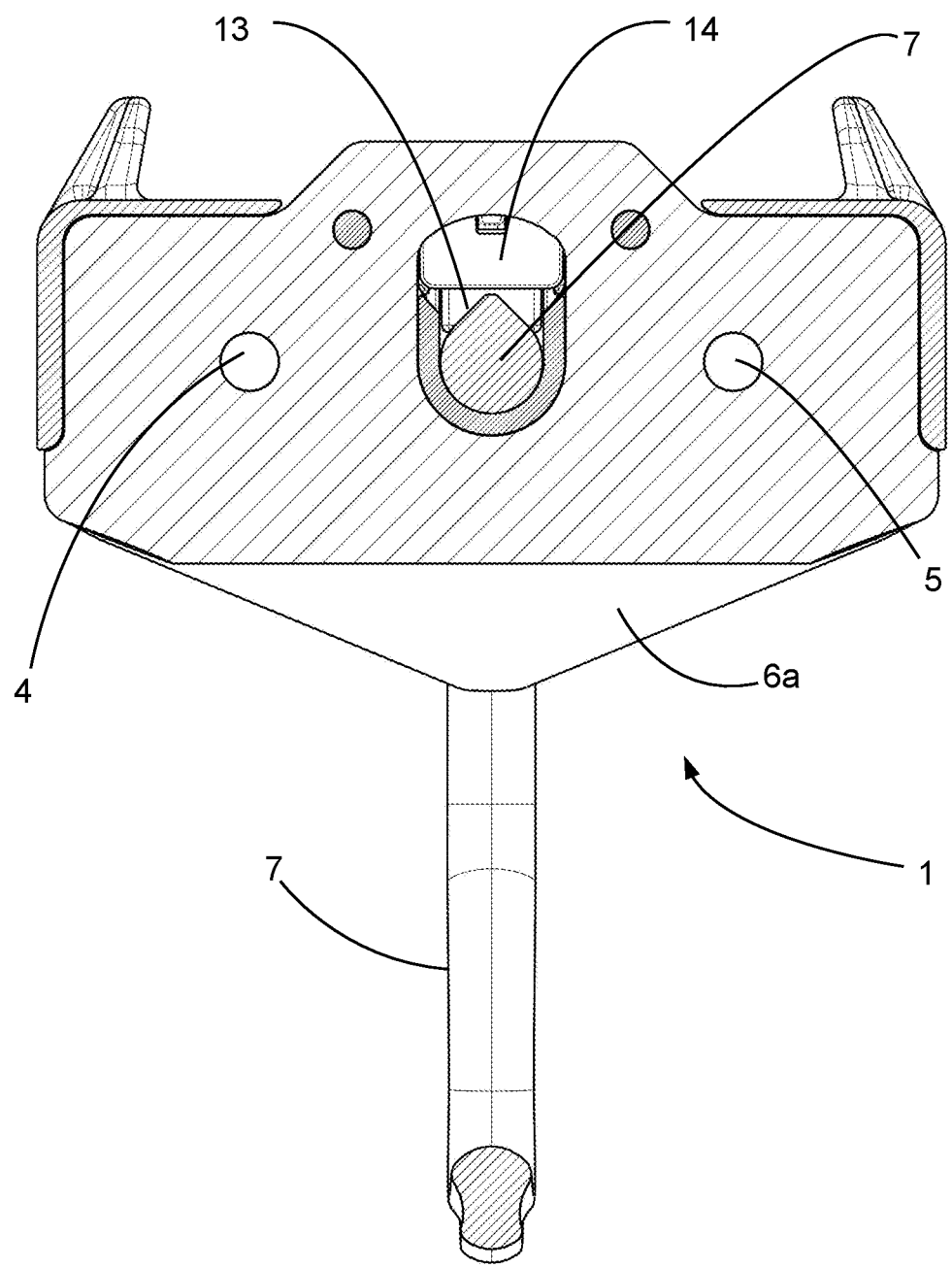
Figure 7:
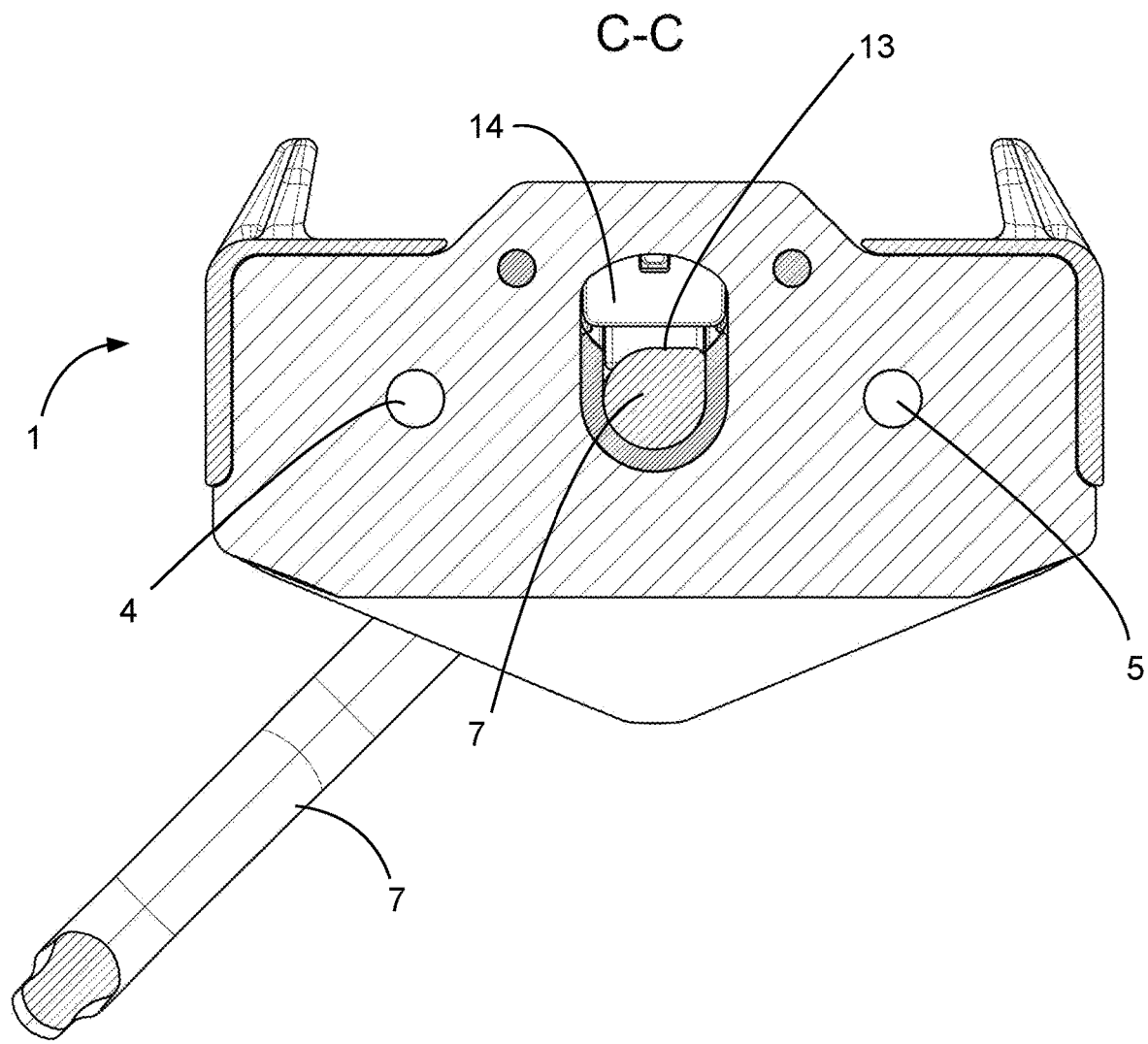

In an advantageous embodiment illustrated in FIGS. 4 and 5, each sheave 2, 3 is configured to pivot around an axis of rotation. The axes of rotation of the spindles of sheaves 2, 3 and the axis of rotation of carabiner 7 belong to one and the same plane. This configuration makes it possible to have all the axes of rotation in the same plane in the deceleration phase. This configuration improves the stability of pulley 1 fitted on the cable. In an alternative configuration, the axis of rotation of the carabiner is located above the plane containing the axes of rotation of the two sheaves.

The axis of rotation of the carabiner is located between the two sheaves preferably at equal distance between the two sheaves. Such a configuration enables better monitoring of the wear of the sheaves and makes operation of the tandem pulley easier regardless of the direction of progression along the cable.

Preferentially, bracket 6 comprises a pair of parallel or substantially parallel flanges 6a, 6b. Flanges 6a, 6b are separated by sheaves 2, 3 and advantageously by spring 8. Each flange 6a, 6b defines an aperture 9, 10 and the two apertures 9, 10 are aligned in a direction parallel to the axis of rotation of sheaves 2, 3.

Carabiner 7 is inserted in the pair of apertures 9, 10. The diameter of each sheave 2, 3 is chosen so that the point of contact of carabiner 7 on bracket 6 is located above the point of contact of sheaves 2, 3 on the cable. In operation, the user is suspended by carabiner 7 and tandem pulley 1 is placed on the cable, the load-bearing point of carabiner 7 on bracket 6 being located above the horizontal or substantially horizontal plane containing the two points of contact between the cable and sheaves 2, 3.

In advantageous manner, carabiner 7 comprises a body defining a flat surface 11. Spring 8 exerts a force on flat surface 11. The force exerted on flat surface 11 moves carabiner 7 to the rest position. The use of a flat surface 11 in the body of carabiner 7 makes it possible to easily manufacture a body that is not of circular cross-section and that interacts efficiently with spring 8. In advantageous manner, spring 8 is terminated by a connector 12 defining a flat contact area. The flat contact area comes into contact with flat surface 11. Spring 8 tends to reach the rest position bringing the two flat surfaces into contact with one another. This configuration enables a solid and efficient body to be formed to move carabiner 7 back to the rest position. The proposed configuration is particularly advantageous as it enables the body of carabiner 7 to be constrained in simple matter.

In a particular embodiment, spring 8 is arranged on one side of the plane defined by the axes of rotation of the sheaves. Carabiner 7 is mainly located on the other side of the plane with in particular movable gate 7a and the attachment point between carabiner 7 and the user. With such a configuration, when the user is suspended by means of carabiner 7, the user does not apply any additional stress on spring 8. In other words, the weight of the user is not applied on spring 8. This makes it possible to use a spring 8 having a limited stiffness as the stiffness is used to move carabiner 7 to the rest position. When the user is suspended by carabiner 7 and moves with respect to the pulley, carabiner 7 can swivel.

In advantageous manner, the tandem pulley has an interface element 12a arranged between bracket 6 and carabiner 7 and preferentially between flanges 6a, 6b and carabiner 7. When flanges 6a, 6b and carabiner 7 are made from metal, it is advantageous to use an interface element made from plastic which will prevent direct contact between the two metallic materials. It is advantageous to provide for interface element to be mounted fixed with respect to bracket 6 so as to have only the rotation of carabiner 7 with respect to the interface element.

In the illustrated embodiment, spring 8 is compressed by carabiner body 7 when it moves away from the rest position in both stressing directions. It is also possible to provide for spring 8 to be tensile stressed even if this embodiment is less attractive.

It is also possible to provide for the use of several springs, for example in the form of flexible parts, applying opposing forces to define the rest position. The force applied by the user suspended by means of the carabiner modifies the distribution of the forces so that the carabiner rotates. This configuration is less advantageous.

It is also possible to provide for carabiner 7 to define a first salient area 13 forming a first end-of-travel stop when rotation of carabiner 7 takes place from the rest position. First salient area 13 forms an end-of-travel stop when movement takes place in a first direction of rotation corresponding to the direction of rotation during deceleration of the tandem pulley, i.e. a movement moving openable gate 7a towards the front sheave of the pulley. The end-of-travel stop limits the angular deviation with respect to the rest position.

First salient area 13 forms an end-of-travel stop limiting rotation of carabiner 7 and prevents the carabiner from touching the cable or from rising up too high when deceleration of the pulley takes place, which could be detrimental to user safety. Limiting the rotation of the carabiner enables a good contact to be ensured between the cable and sheaves.

When a flat surface is used, the end-of-travel stop is advantageously configured so as to prevent the carabiner from rotating beyond flat surface 11, i.e. so that spring 8 is still pressing on one end of the flat surface to bias the carabiner to the rest position.

In advantageous manner, the end-of-travel stop is configured to limit rotation of the carabiner from the rest position to a value of less than 45° and preferentially less than 30°.

In advantageous manner, first salient area 13 does not play any part in applying the bias force biasing carabiner 7 to the rest position. Preferentially, first salient area 13 limits the rotation of carabiner 7 by coming into contact with one of the flanges of bracket 6. The contact between the salient part and the flange can be direct or a salient part can press on interface element 12a itself pressing on the flange of bracket 6.

This configuration is particularly advantageous as salient part 13 presses on the flange of the bracket enabling high stresses to be withstood without excessive loading of spring 8. Once salient part 13 has come into contact with interface element 12a or with the flange, carabiner 7 stops its rotation and the forces applied by carabiner 7 are not transmitted to spring 8.

It is particularly advantageous to provide for carabiner body 7 to have a second salient part that also takes part in limiting the rotation of carabiner 7 with respect to bracket 6.

In the illustrated embodiment, the two salient parts 13 are separated so as to come into contact with the two opposite flanges of bracket 6. The two salient parts 13 are identical or substantially identical in the sense that they simultaneously stop the rotation of the body. This configuration is particularly advantageous as two forces oppose rotation of the carabiner on each side of spring 8 which prevents or reduces rotation of the body in a direction that is not parallel to the axes of rotation of the sheaves.

Preferentially, the two salient parts 13 present the same shape.

It is advantageous to provide for interface element 12a to extend beyond flanges 6a, 6b in the direction of rotation of sheaves 2, 3 as this enables the surface contact between salient parts 13 and carabiner 7 to be increased. It is then possible to achieve a better control of the rotation of carabiner 7 when carabiner 7 reaches the end of travel.

In order to achieve better control of the rotation of carabiner 7 with respect to bracket 6, it is advantageous to provide for the body to define a straight area having a length that is greater than or equal to the thickness of bracket 6, i.e. the dimension along the axis of rotation of the sheaves. The straight area forms the rotation spindle of the carabiner. The straight area is opposite the attachment area of the user. In advantageous manner, the major axis of the carabiner, the maximum straight internal distance of the carabiner, is perpendicular to the axis of rotation.

Figure 3:
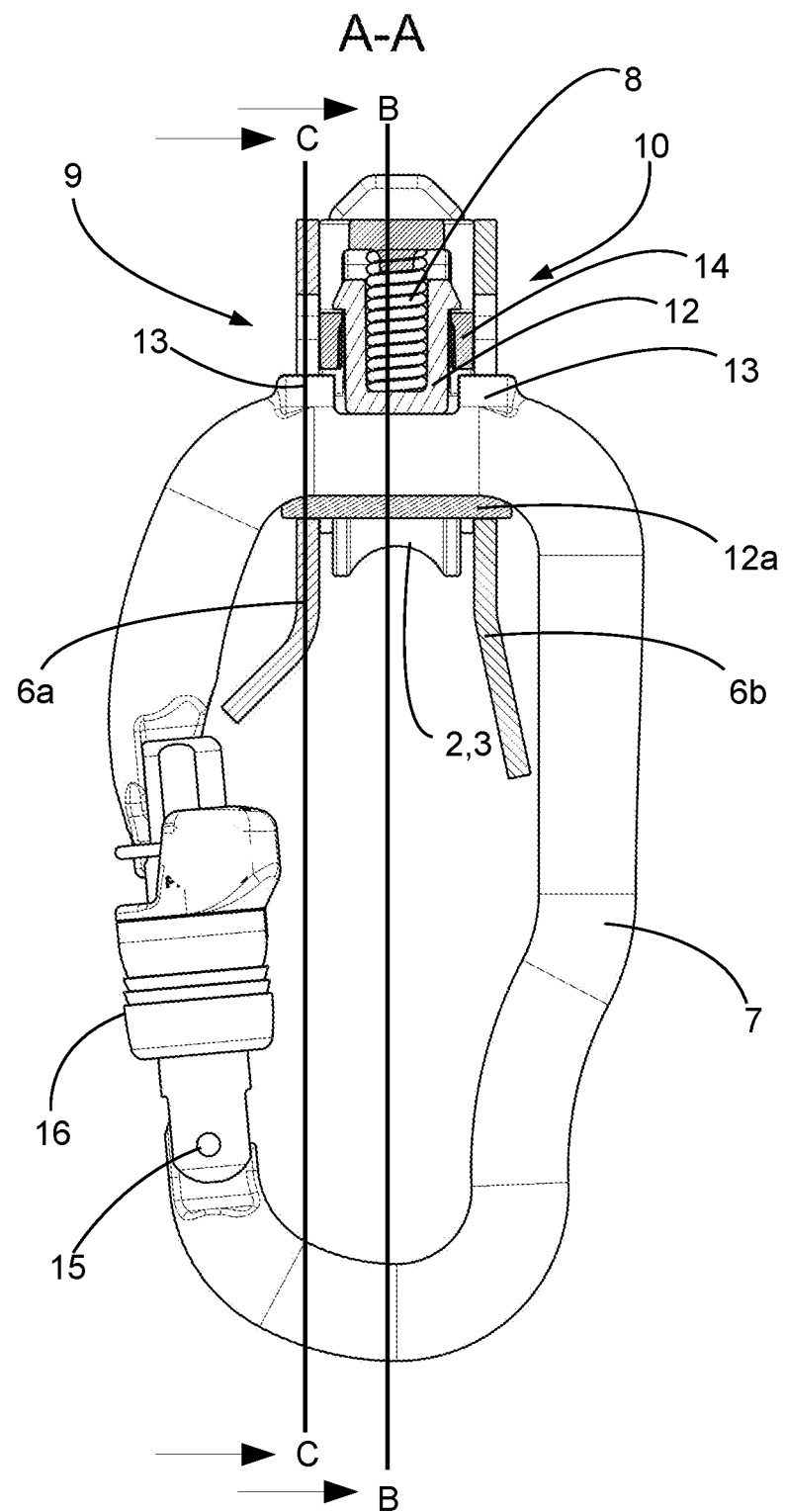
FIG. 3 schematically represents a tandem pulley with a closed carabiner in cross-section in the plane AA, FIG. 4 schematically represents a tandem pulley in longitudinal section, the carabiner being in the rest position in the plane BB, FIG. 5 schematically represents a longitudinal section of a tandem pulley with its carabiner offset in the plane BB, FIG. 6 schematically represents a tandem pulley in longitudinal section, the carabiner being in the rest position in the plane CC, FIG. 7 schematically represents a longitudinal section of a tandem pulley with its carabiner offset in the plane CC.

As illustrated in FIGS. 3, 4 and 5, when carabiner 7 rotates, the value of the contact surface between bracket 6 and carabiner 7 is constant or substantially constant. It is then easier to have only a rotation of carabiner 7 with respect to bracket 6. In advantageous manner, the body of the carabiner presents a circular cross-section with a flat surface.

Carabiner body 7 interacts with spring 8 so that it is possible for the carabiner to lift up with respect to bracket 6 which could be detrimental to satisfactory operation of the pulley. It is particularly advantageous to provide for interface element 12a to have a clamp 14 that is fitted in such a way as to prevent movement of carabiner 7 perpendicularly to the plane containing the two axes of rotation of sheaves 2, 3. Clamp 14 can be arranged to prevent movement of carabiner 7 over a distance greater than or equal to 0.5 cm. Preferably, the movement of carabiner 7 is less than or equal to 0.3 cm. Preferentially, clamp 14 comes into contact with the salient part and preferably with the two salient parts.

In the illustrated embodiment, a receptacle is arranged in support bracket 6. Spring 8 is housed in the receptacle. The receptacle is closed by a cover 6c. Cover 6c can be secured by means of one or more securing parts 6d that may be removable or not, for example screws or rivets. It is advantageous to provide for spring 8 to press on the cover to apply a force on the body.

The two apertures arranged in the flanges of bracket 6 are advantageously larger than the cross-section of carabiner body 7 designed to swivel in bracket 6. In this way, it is possible to fit and remove the body easily by making carabiner 7 slide.

Installation of spring 8 and advantageously of clamp 14 prevents sliding of carabiner 7 and forces the latter to only have a pivoting movement around an axis parallel to the axis of rotation of sheaves 2, 3.

In the illustrated configuration, salient part 13 also forms an end-of-travel stop limiting rotation of carabiner 7 when the latter swivels in the other direction of rotation. The proposed configuration enables pulley 1 to be used in both directions, i.e. pulley 1 can be used with the right hand or with the left hand without modifying the functioning of tandem pulley 1.

Advantageously, flange 6a situated on the same side as movable gate 7a of carabiner 7 is shorter than the other flange 6b. Flange 6b can be configured to prevent opening of gate 7a towards the inside of the carabiner when tandem pulley device 1 is installed on the cable. This configuration enables the direction of fitting of carabiner 7 to be defined. Only flange 6a can allow opening of gate 7a of carabiner 7. In an alternative embodiment that is not illustrated, flange 6a defines a rounded area the centre of which is located on the axis of rotation of carabiner 7. The rounded area follows the position of carabiner gate 7a to allow opening of the carabiner in all positions of the carabiner when rotation of the carabiner takes place. This configuration reduces the risk of the user's fingers being pinched when carabiner 7 rotates and the user is gripping carabiner 7.

Gate 7a is mounted pivoting on a spindle 15 of the carabiner body 7 and is biased to the closed position by a return spring. It is advantageously equipped with a locking ring 16 (FIG. 2) to lock gate 7a in the closed position during use.

In advantageous manner, the bottom parts of the two flanges 6a, 6b of bracket 6 are curved outwards to form a funnel enabling quick insertion of the cable on sheaves 2, 3. The end of flange 6b is arranged as a stop to ensure stable positioning of carabiner 7 in a vertical position perpendicular to bracket 6.

Preferentially, sheaves 2, 3 are made from stainless steel or aluminium and can be mounted rotating on ball-bearings or self-lubricating bearings.

Tandem pulley 1 is designed to move with respect to a cable with a user suspended on carabiner 7. The user can be suspended by means of a lanyard forming the mechanical connection between the user and carabiner 7. The lanyard is located in the bottom part of the pulley, i.e. underneath the plane containing the two axes of rotation of the sheaves. The lanyard can be in the form of a rope or strap.

By preventing rotation of the tandem pulley around the axis of the spindle of the rear sheave, it is possible to prevent preferential wear of the rear sheave with respect to the front sheave. The carabiner can be dismountable making it easier to change in the event of malfunctioning.

As spring 8 presses carabiner 7 against bracket 6, movement of carabiner 7 is better controlled. The carabiner makes a rotation and preferably a rotation inside a plastic part. The wear of carabiner and the wear of the apertures arranged in the flanges are better controlled.

Implementation of a tandem pulley device 1 on the cable is performed in the following manner. The user holds tandem pulley 1 by means of carabiner 7 and opens movable gate 7a. Spring 8 secures carabiner 7 in the rest position with respect to bracket 6. Bracket 6 seems be movable with respect to carabiner 7 in the insertion step of the cable in carabiner 7 as spring 8 applies a force that is higher than the force applied by the weight of bracket 6 to make it rotate with respect to carabiner 7.

The cable comes into engagement on the contact points of sheaves 2, 3. Once carabiner 7 has been reclosed, the cable is locked in carabiner 7. After the descent phase along the cable, in a deceleration phase where the user decelerates after tandem pulley 1, carabiner 7 swivels to the front resulting in a better contact of the cable with the two sheaves throughout the deceleration.

After the deceleration phase, spring 8 applies a sufficient force to move carabiner 7 to the rest position. The user can handle tandem pulley 1 to extract the cable using carabiner 7 as he did to perform insertion of the cable.

The invention claimed is:
1. A tandem pulley comprising:
    a support bracket defining a through hole,
    a pair of sheaves arranged in line inside the support bracket, each sheave being fitted rotating freely around a spindle fixed to the support bracket,
    a carabiner fitted in the through hole, the carabiner being fitted rotating around an axis parallel to the spindles of the pair of sheaves,
    a flexible device connected to the support bracket, the flexible device being arranged to exert a force on the carabiner and to move the carabiner to a rest position by rotation of the carabiner.
2. The tandem pulley according to claim 1, wherein each sheave is configured to pivot around an axis of rotation, the axes of rotation of the sheaves and the axis of rotation of the carabiner are in substantially a same plane.
3. The tandem pulley according to claim 2, wherein the carabiner comprises a body defining a flat surface, the flexible device exerting a force on the flat surface to move the carabiner to the rest position.

4. The tandem pulley according to claim 3, wherein the flexible device is arranged on one side of the plane, the carabiner having a movable gate arranged on an opposite side of the plane.

5. The tandem pulley according to claim 1, wherein the carabiner defines a first salient area forming a first end-of-travel stop pressing on a flange of the support bracket when rotation of the carabiner takes place from the rest position in a first direction of rotation.

6. The tandem pulley according to claim 5, wherein the carabiner defines a second salient area forming a second end-of-travel stop when rotation of the carabiner takes place from the rest position.

7. The tandem pulley according to claim 6 wherein the first salient area and the second salient area are separated by the flat surface in the direction of rotation of the carabiner.

8. The tandem pulley according to claim 7, wherein the first salient area and the second salient area collaborate with a clamp to prevent movement of the carabiner perpendicularly to a plane containing the two axes of rotation of the pair of sheaves.

9. The tandem pulley according to claim 7, wherein the first salient area or the second salient area collaborates with a clamp to prevent movement of the carabiner perpendicularly to a plane containing the two axes of rotation of the pair of sheaves.

10. The tandem pulley according to claim 1, wherein the flexible device applies the force on the carabiner that is greater than a weight of the support bracket.

11. The tandem pulley according to claim 3 wherein the first salient area and the second salient area are separated by the flat surface in the direction of rotation of the carabiner.

* * * * *